Feb. 6, 1934.  P. R. ZINSER  1,945,718
FABRICATION OF THERMO PLASTIC SHEET MATERIAL
Filed Sept. 23, 1930
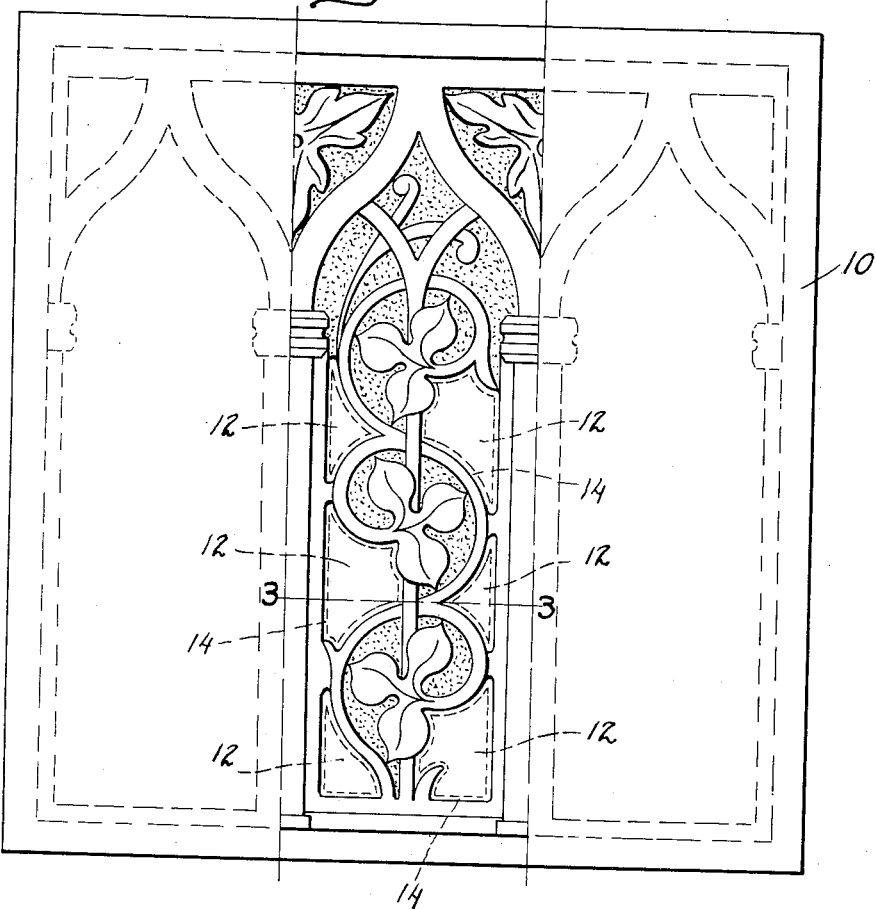
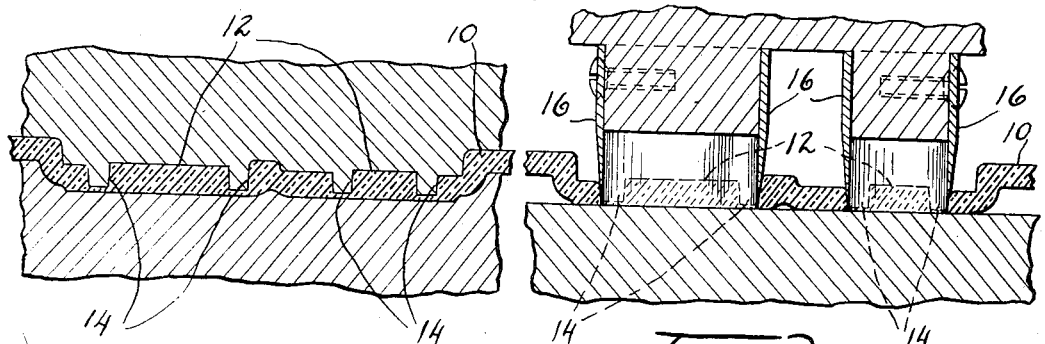
INVENTOR.
Paul R. Zinser
BY
Parker J Burton
ATTORNEYS Patented Feb. 6, 1934

1,945,718

UNITED STATES PATENT OFFICE 1,945,718

FABRICATION OF THERMO-PLASTIC SHEET MATERIAL

Paul R. Zinser, Detroit, Mich., assignor to Woodall Industries Incorporated, Detroit, Mich., a corporation of Michigan Application September 23, 1930
Serial No. 483,963

13 Claims. (Cl. 41—24)

My invention relates to improvements in the fabrication of composition fibrous thermoplastic sheet material or the like into apertured panels, such as decorative grilles or other similar structures, and to the piercing, cutting, trimming and embossing of such material or otherwise working therewith after the manner herein set forth.

An object of my invention is to provide an improved method whereby material of this character may be easily, quickly, and cheaply cut, trimmed, pierced with small or intricate apertures or fashioned into decorative grille work or may be given a decorative design embodying embossing, debossing and aperturing.

It applies particularly to the treatment of material of the character described which possesses substantial thickness and body.

A feature of importance is that the material may be subjected to the treatment here specified to produce the results outlined without injury or damage to the material itself or to its final form and with a resulting minimum quantity of defective product.

Other objects and advantages and meritorious features of my invention will more fully appear from the following specification, appended claims and accompanying drawing wherein:

Fig. 1 is a front elevation of a panel structure illustrating my invention,

Fig. 2 is a section of a fragment of a blank of sheet material being acted upon in a die after the manner set forth in my invention, Fig. 3 illustrates the same fragment of sheet material shown in Fig. 2 being subjected to a cutting operation included in my invention.

My improved process is particularly adapted to be employed in working thermo-plastic sheet or board material of considerable thickness. By thermo-plastic sheet or board material I refer to that class of sheet or board material which ordinarily is of a cellulose fibrous composition and which carries a suitable binder in such quantity and of such a character that the sheet material is responsive to the application of a determined heat and pressure so that it may be shaped into various forms and so that it will, upon the cooling of the material following the shaping operation, retain the form into which it has been shaped. A product embodying these characterstics is that commercially known as "K B" board which is a cellulose fiber composition carrying a substantial content of an asphalt and clay mixture. This particular board is substantially waterproof and possesses considerable strength and resistance to distortion or rupture, but under the effect of a predetermined heat and pressure it can be shaped within limits and will, upon cooling, retain its shaped form. Other composition board might prove suitable for carrying out my process and I do not wish to limit the same beyond the definition of the claims and the method here outlined, and it is to be taken as applicable to thermo-plastic sheet material generally.

It has developed that thermo-plastic sheet material of this kind is particularly suitable for the fabrication of various decorative pieces such as decorative grilles for radio cabinets or the like and that it may be shaped up under a prescribed heat and pressure into attractive decorative forms including embossing, debossing, and aperturing. The term "deboss" is utilized to distinguish from "emboss" where the die formed portion of the sheet is depressed below its original surface level instead of raised thereabove. To permit of pronounced embossing or debossing the board, or sheet, however, must possess considerable thickness and in the formation of a decorative grille of the character referred to it is necessary that the panel be pierced with a plurality of relatively small intricate apertures. It is also essential that these apertures be formed without injury or damage to the panel structure and that the line of severance be clean.

To form small intricate apertures in sheet material of this character having substantial thickness has heretofore proven expensive and difficult.

I have found that in the formation of a decorative grille from material of this character that it is possible with a die stamping operation to give a decorative embossed and debossed effect to one surface of the panel, such as is illustrated in the central portion of the panel 10 in Fig. 1, and to include at the same time a debossing operation which will define in debossed grooves certain portions to be removed to form the apertures in the grille.

In Fig. 1 certain of these portions are indicated as 12. The same portions are shown in Figs. 2 and 3 and the grooves which outline them are there indicated as 14. It will be seen that these grooves possess substantial depth being debossed almost to the point of piercing through the panel. The material which is displaced to form the groove is caused to flow away from the groove line and in Figs. 2 and 3 the portions 12 are shown as increased in height because of this flow of material. In grille structures of this kind these apertures generally appear adjacent to embossed portions and they are here so shown.

It is now possible to remove the desired portions to form the apertures by means of a sharp cutting tool such as a thin steel knife of the character shown in Fig. 3 and indicated as 16. The side wall of the groove 14 is left in a finished condition as a result of the debossing operation and the thin steel knife moves easily through the very thin bottom portion of the groove so that the side walls of the apertures have a clean outline and the adjacent structure of the panel is not broken or ruptured by the formation of the aperture.

By following the above process it is possible to form very small and irregular apertures of an intricate design without any damage to the adjacent material of the panel and in a cheap and expeditious manner while the cutting of such apertures through the entire thickness of the panel would be substantially impossible and would frequently produce a broken and ruptured condition of the panel structure.

The method outlined above is also suitable for trimming away the edge portion of the panel as shown by the debossed groove indicated as 18 where such a groove is employed to define the panel margin and the portion beyond the groove is to be removed. It is particularly advantageous however where small and irregular apertures are to be formed as above set forth.

What I claim:

1. That method of forming a decorative grille of fibrous thermo-plastic sheet material comprising subjecting the same to die pressure to form a decorative surface thereon and simultaneously defining by debossed lines portions to be removed, and removing said portions by cutting the same along said debossed lines.

2. That method of forming a decorative grille from a sheet blank of fibrous thermo-plastic material comprising subjecting the same to the action of pressure means to provide debossed and embossed portions, certain of said debossed portions being of substantial depth, and cutting along said debossed lines of substantial depth to separate the portions of the sheet delineated thereby from the main body of the sheet to form apertures therethrough.

3. That method of forming a decorative grille from a sheet blank of thermo-plastic material comprising subjecting the same to the action of pressure means to form embossed portions therein and closely adjacent thereto debossed grooves defining portions to be removed to form apertures through the blank and cutting along the line of said grooves to remove the portions defined thereby.

4. That method of forming a decorative grille from a sheet blank of fibrous thermoplastic material of substantial thickness comprising subjecting the same to the pressure action of forming mechanism to provide embossed and debossed decorative portions and to form debossed grooves adjacent said embossed portions defining portions to be removed to form apertures in the blank and cutting the same through said debossed grooves to form said apertures.

5. That method of forming a decorative apertured panel from relatively thick thermoplastic sheet material comprising subjecting the same to the pressure action of forming mechanism to provide decorative embossing thereon and to provide simultaneously therewith and closely adjacent thereto debossed grooves which define portions to be removed to form apertures, and then cutting the same along the line of said debossed grooves to form said apertures.

6. That method of forming a relatively small and irregular aperture in a relatively thick sheet of fibrous thermo-plastic material which comprises first defining the aperture to be formed by a debossed groove and then cutting the material through the bottom of the groove along the outer wall thereof to remove that portion defined by the groove.

7. That method forming an aperture in a sheet of thermo-plastic material which comprises outlining the portion to be removed to form the aperture by debossing along the outline, then cutting the same along the line of said debossing to remove said outlined portion.

8. That method of cutting a sheet of relatively thick thermo-plastic material which includes first forming a debossed groove along the line of intended severance and then cutting the same along the line of said groove adjacent one wall thereof.

9. An intermediate product in the formation of a decorative grille of thermo-plastic sheet material comprising a sheet of said material on one surface of which a decorative design of embossing and debossing has been formed, certain of said channeled debossments defining portions to be removed to form apertures.

10. An intermediate product in the formation of a decorative apertured panel of thermo-plastic sheet material of considerable thickness comprising a sheet of said material upon one surface of which embossed portions have been formed and adjacent thereto debossed grooves have been formed to define those parts to be removed to form the apertures through the panel.

11. That method of forming a decorative grille in a blank sheet of material which includes the steps of forming grooves to define the desired open work and subsequently removing the portions so defined by cutting through said grooves.

12. That method of forming a decorative grille in a blank sheet of material which includes the steps of forming grooves to define the desired open work and subsequently removing the portions so defined by cutting along the outer walls of said grooves.

13. That method of forming a decorative grille in a blank sheet of material which includes the steps of forming grooves of a depth approaching the thickness of the sheet to define the desired open work and subsequently removing the portions so defined by cutting along the outer walls of said grooves.

PAUL R. ZINSER.